(12) United States Patent
Yoshii et al.

(10) Patent No.: US 7,177,138 B2
(45) Date of Patent: Feb. 13, 2007

(54) CHIP-TYPE ELECTRONIC COMPONENT

(75) Inventors: Akitoshi Yoshii, Yurihonjou (JP);
Taisuke Ahiko, Nikaho (JP); Shirou Ootsuki, Nikaho (JP); Takashi Aoki, Nikaho (JP); Akira Goshima, Nikaho (JP); Hiroki Houchi, Nikaho (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/295,487

(22) Filed: Dec. 7, 2005

(65) Prior Publication Data

US 2006/0126264 A1    Jun. 15, 2006

(30) Foreign Application Priority Data

Dec. 14, 2004    (JP)    ............................ P2004-361793

(51) Int. Cl.
*H01G 4/228*    (2006.01)

(52) U.S. Cl. .................... 361/306.3; 361/306.1; 361/301.1; 361/321.2; 361/308.1

(58) Field of Classification Search ............. 361/306.1, 361/306.2, 306.3, 311–313, 321.1, 321.2, 361/321.5, 308.1, 308.3, 301.1, 523–528; 174/250, 255
See application file for complete search history.

(56) References Cited

U.S. PATENT DOCUMENTS

| | | | |
|---|---|---|---|
| 5,831,810 A * | 11/1998 | Bird et al. | ............... 361/301.1 |
| 6,236,561 B1 * | 5/2001 | Ogino et al. | ................ 361/523 |
| 6,246,013 B1 * | 6/2001 | Yoshida et al. | ............. 174/260 |
| 6,381,120 B2 * | 4/2002 | Sakai | ...................... 361/321.2 |
| 6,410,858 B1 * | 6/2002 | Sasaki et al. | ............... 174/255 |
| 6,477,030 B2 * | 11/2002 | Hidaka et al. | ........... 361/301.3 |

FOREIGN PATENT DOCUMENTS

| | | |
|---|---|---|
| JP | A 10-22164 | 1/1998 |
| JP | A 2002-25850 | 1/2002 |

* cited by examiner

*Primary Examiner*—Nguyen T. Ha
(74) *Attorney, Agent, or Firm*—Oliff & Berridge, PLC

(57) ABSTRACT

A chip-type electronic component comprises a chip element body including an inner circuit element, and a pair of terminal electrodes electrically connected to the inner circuit element. The pair of terminal electrodes are positioned at respective end portions of the chip element body. The chip element body has one side face acting as a mounting surface opposing a circuit substrate. The pair of terminal electrodes include an electrode portion formed on the mounting surface. Here, it is assumed that a first direction is a direction orthogonal to the mounting surface, a second direction is a direction along which the pair of terminal electrodes oppose each other on the mounting surface, and a third direction is a direction orthogonal to the first and second directions. A first length of the electrode portion along the second direction from an edge portion of the mounting surface at a center region in the third direction is set longer than a second length of the electrode portion along the second direction from the edge portion of the mounting surface at both end regions in the third direction.

6 Claims, 6 Drawing Sheets

Fig.5

| L1 (μm) | 150 | 160 | 170 | 180 | 190 | 200 | 210 |
|---|---|---|---|---|---|---|---|
| L2 (μm) | 150 | 160 | 170 | 180 | 190 | 200 | 210 |
| TOMBSTONE | YES | NO | NO | NO | NO | NO | NO |
| SHORT-CIRCUIT | NO | NO | NO | NO | NO | NO | YES |

Fig.6

| L1 (μm) | 180 | 180 | 180 | 180 | 180 | 180 | 180 |
|---|---|---|---|---|---|---|---|
| L2 (μm) | 175 | 170 | 160 | 150 | 140 | 130 | 125 |
| L1−L2 (μm) | 5 | 10 | 20 | 30 | 40 | 50 | 55 |
| CRACK | YES | NO | NO | NO | NO | NO | NO |
| MOUNTING FAILURE DUE TO ROTATION | NO | NO | NO | NO | NO | NO | YES |

CHIP-TYPE ELECTRONIC COMPONENT

BACKGROUND OF THE INVENTION

1. Field of the Invention

The present invention relates to a chip-type electronic component.

2. Related Background Art

For making electronic apparatus smaller, there has been a high demand for reducing the size of electronic components mounted in electronic apparatus, whereby chip-type electronic components surface-mounted on mounting substrates have been being made smaller in particular. Known as such a kind of chip-type electronic component is one comprising a chip element body including an inner circuit element, and a pair of terminal electrodes positioned at respective end portions of the chip element body and electrically connected to the inner circuit element.

For example, this kind of chip-type electronic component is surface-mounted as the terminal electrodes at both end portions are soldered onto pads of a mounting substrate by way of reflow soldering. These chip-type electronic components have such a small mass as to be easy to move on molten solder in the reflow soldering step. Consequently, there have been cases where the chip-type electronic components rotate in a direction horizontal to a circuit substrate or are erected on the circuit substrate. In particular, when solder cures in a state where a chip-type electronic component is erected (in a so-called tombstone state), electric connections between the chip-type electronic component and pads of the circuit substrate may be broken, whereby the chip-type electronic component may lose its functions on the circuit substrate. Thus, chip-type electronic components having a small outer size incur a fear of causing a mounting failure due to their small mass.

Therefore, in the chip-type electronic component disclosed in Japanese Patent Application Laid-Open No. HEI 10-22164, shoulder portions of outer electrodes (terminal electrodes) traveling from both longitudinal end faces of a ceramic element (chip element body) to its peripheral faces are rounded by a radius of curvature of 60 μm or less while each outer electrode is provided with a protrusion at substantially the center of its portion formed on the end face of the ceramic element such as to form a bump of 5 to 35 μm with respect to its surrounding areas, thereby restraining and preventing the tombstone from occurring. In the chip-type electronic component disclosed in Japanese Patent Application Laid-Open No. 2002-25850, an electrodeless portion unwettable by solder is formed within an end face plane defined by upper and lower side faces and front and rear side faces of the chip component, so as to reduce the moment due to the surface tension of molten solder causing the tombstone, thereby preventing the tombstone from occurring.

SUMMARY OF THE INVENTION

It is an object of the present invention to provide a chip-type electronic component which can restrain mounting failures from occurring while being excellent in resistance to thermal shocks.

The following problems exist in the chip-type electronic components disclosed in Japanese Patent Application Laid-Open Nos. HEI 10-22164 and 2002-25850. Since terminal electrodes are provided with protrusions, the chip-type electronic component disclosed in Japanese Patent Application Laid-Open No. HEI 10-22164 contradicts the demand for making the chip-type electronic component smaller. The chip-type electronic component disclosed in Japanese Patent Application Laid-Open No. 2002-25850 is required to form an electrodeless portion, which complicates the form of terminal electrodes, thereby making it harder to manufacture.

Therefore, taking account of an electrode portion formed on one side face of a terminal electrode opposing the circuit substrate, i.e., on a mounting surface, the inventors diligently studied a chip-type electronic component which can restrain mounting failures from occurring. As a result, the inventors have found a new fact that the occurrence of tombstone can be suppressed when the length of the above-mentioned electrode portion from an edge portion of the mounting surface along a direction in which a pair of terminal electrodes oppose each other on the mounting surface is set longer.

When soldering a chip-type electronic component onto a circuit substrate, a force to pull the chip-type electronic component toward the circuit substrate is exerted on both end portions of the chip-type electronic component by the solder existing between the electrode portion and a pad of the circuit substrate. This seems to imply that, when the length of the electrode portion from the edge portion of the mounting surface is set longer, the force to pull the chip-type electronic component toward the circuit substrate becomes greater, thereby suppressing the occurrence of tombstone.

When mounting a chip-type electronic component to a circuit substrate by soldering or the like, a thermal shock is imparted to the chip-type electronic component. A chip element body is usually constituted by ceramic. Therefore, when a thermal shock is applied to the chip-type electronic component, terminal electrodes are more likely to shrink than the chip element body. The resulting contraction stress may focus on surroundings of an edge portion of the terminal electrode, from which cracks may occur in the chip element body. When the surrounding temperature drastically changes after the chip-type electronic component is mounted to the circuit substrate, stress absorption may become insufficient because of differences in thermal expansion coefficient among the chip element body, terminal electrodes, solder, circuit substrate, etc., whereby cracks may occur similarly in the chip element body from the surroundings of edge portions of the terminal electrodes.

Therefore, the inventors also diligently studied chip-type electronic components excellent in resistance to thermal shocks. As a result, the inventors have found a new fact that cracks are easier to occur in the chip element body when the length of the above-mentioned electrode portion from the edge portion of the mounting surface is set longer.

When the length of the above-mentioned electrode portion from the edge portion of the mounting surface is set longer, the contact area between the electrode portion and circuit substrate becomes greater, while the contact area between the electrode portion and chip element body increases. This seems to imply that the stresses applied from the circuit substrate and electrode portion act on the chip element body without fully being absorbed, whereby cracks are likely to occur in the chip element body. The above-mentioned stresses seem to be likely to focus on the vicinity of ridges of the chip element body in particular.

In view of the foregoing results of studies, the present invention provides a chip-type electronic component comprising a chip element body including an inner circuit element, and a pair of terminal electrodes positioned at respective end portions of the chip element body and electrically connected to the inner circuit element; wherein the chip element body has one side face acting as a mounting surface opposing a circuit substrate; wherein the pair of terminal electrodes include an electrode portion formed on the mounting surface; and wherein, assuming that a first direction is a direction orthogonal to the mounting surface, a second direction is a direction along which the pair of terminal electrodes oppose each other on the mounting surface, and a third direction is a direction orthogonal to the first and second directions, a first length of the electrode portion along the second direction from an edge portion of the mounting surface at a center region in the third direction is set longer than a second length of the electrode portion along the second direction from the edge portion of the mounting surface at both end regions in the third direction.

Since the first length of the electrode portion along the second direction from an edge portion of the mounting surface at the center region in the third direction is set longer than the second length of the electrode portion along the second direction from the edge portion of the mounting surface at both end regions in the third direction, the chip-type electronic component in accordance with the present invention can restrain the tombstone from occurring and enhance the resistance to thermal shocks.

Preferably, the first length is set to 160 μm or longer, whereas the difference between the first and second lengths is set to 10 μm or longer. This can reliably suppress the occurrence of tombstone, and further enhance the resistance to thermal shocks.

Preferably, the first length is set to 200 μm or less. This can restrain a pair of terminal electrodes from being short-circuited.

Preferably, the difference between the first and second lengths is set to 50 μm or less. This can restrain the chip-type electronic component from being rotated in a direction horizontal to the circuit substrate.

Preferably, the chip element body has a rectangular parallelepiped form, whereas the third direction is a longitudinal direction of the chip element body. Preferably, the chip element body has a rectangular parallelepiped form whose lengths in the longitudinal direction (L), height direction (H), and width direction (W) are $L \leq 1.0$ mm, $H \leq 0.5$ mm, and $W \leq 0.5$ mm.

The present invention can provide a chip-type electronic component which can suppress the occurrence of mounting failures while being excellent in resistance to thermal shocks.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 5 is a chart showing results of a test for determining the occurrence of tombstone; and FIG. 6 is a chart showing results of a thermal shock test.

DESCRIPTION OF THE PREFERRED EMBODIMENTS

In the following, a preferred embodiment of the chip-type electronic component in accordance with the present invention will be explained in detail with reference to the accompanying drawings. In the explanation, constituents identical to each other or those having functions identical to each other will be referred to with numerals identical to each other without repeating their overlapping descriptions. This embodiment is an example in which the present invention is employed in a multilayer chip capacitor.

Figure 1:
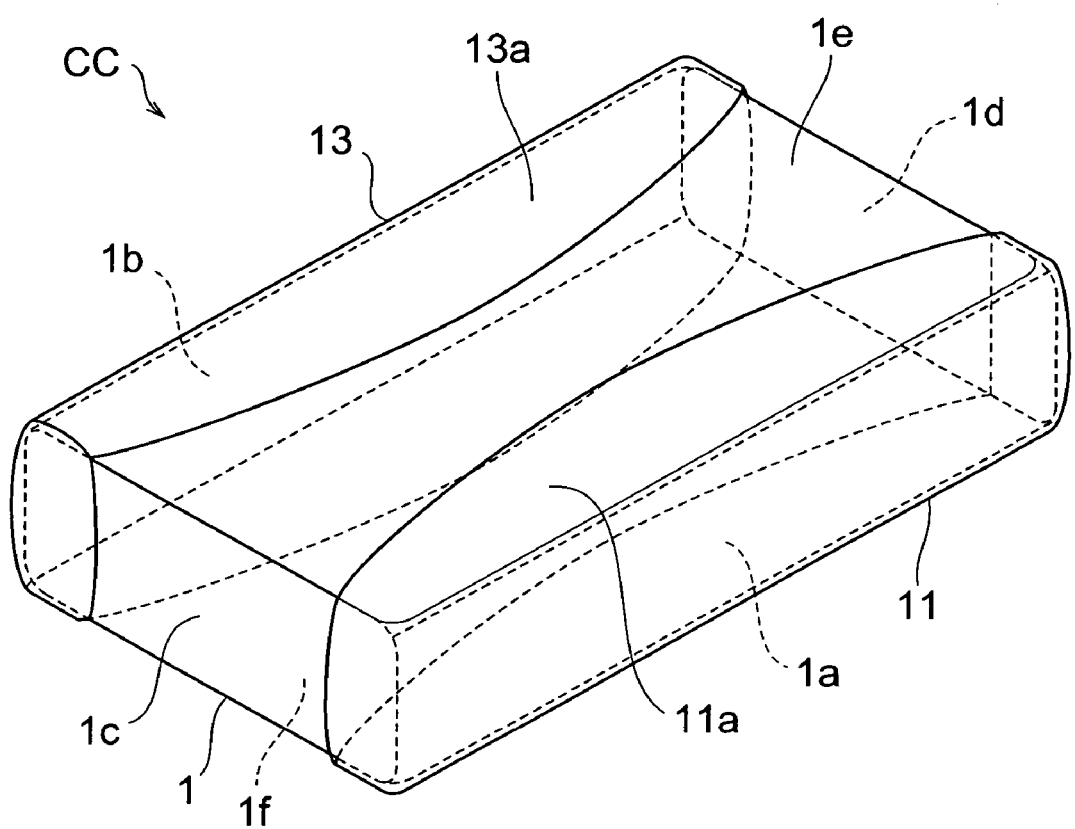
FIG. 1 is a perspective view showing a multilayer chip capacitor in accordance with an embodiment.
Figure 1:
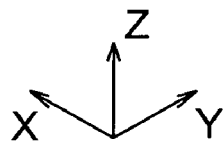
Figure 2:
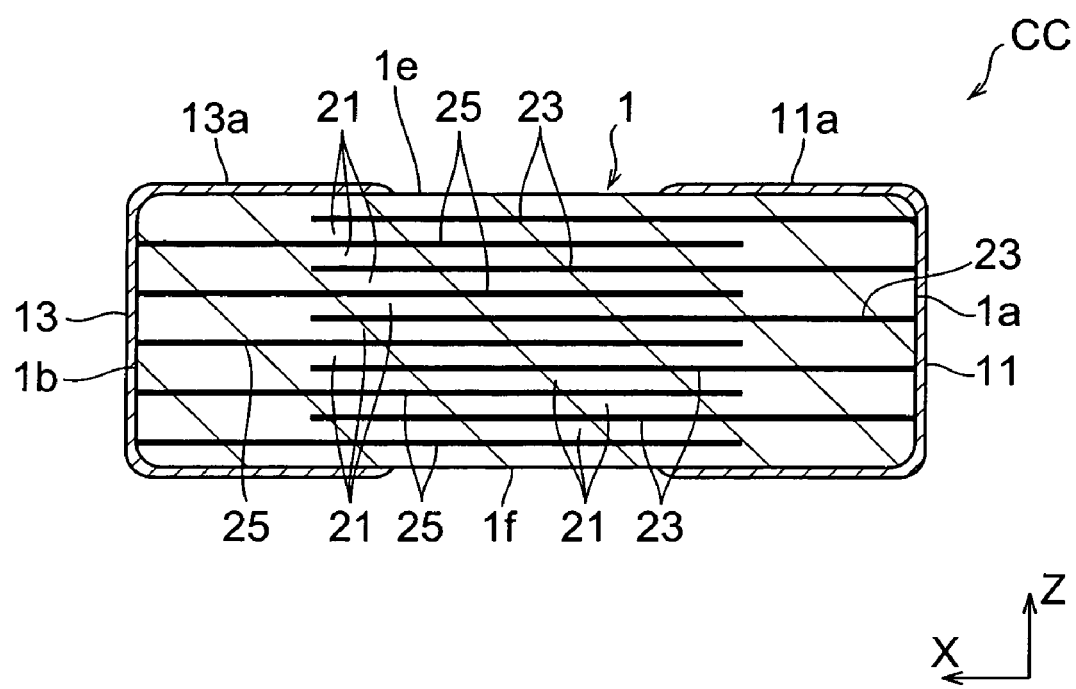
FIG. 2 is a view for explaining a cross-sectional configuration of the multilayer chip capacitor in accordance with the embodiment.
Figure 3:
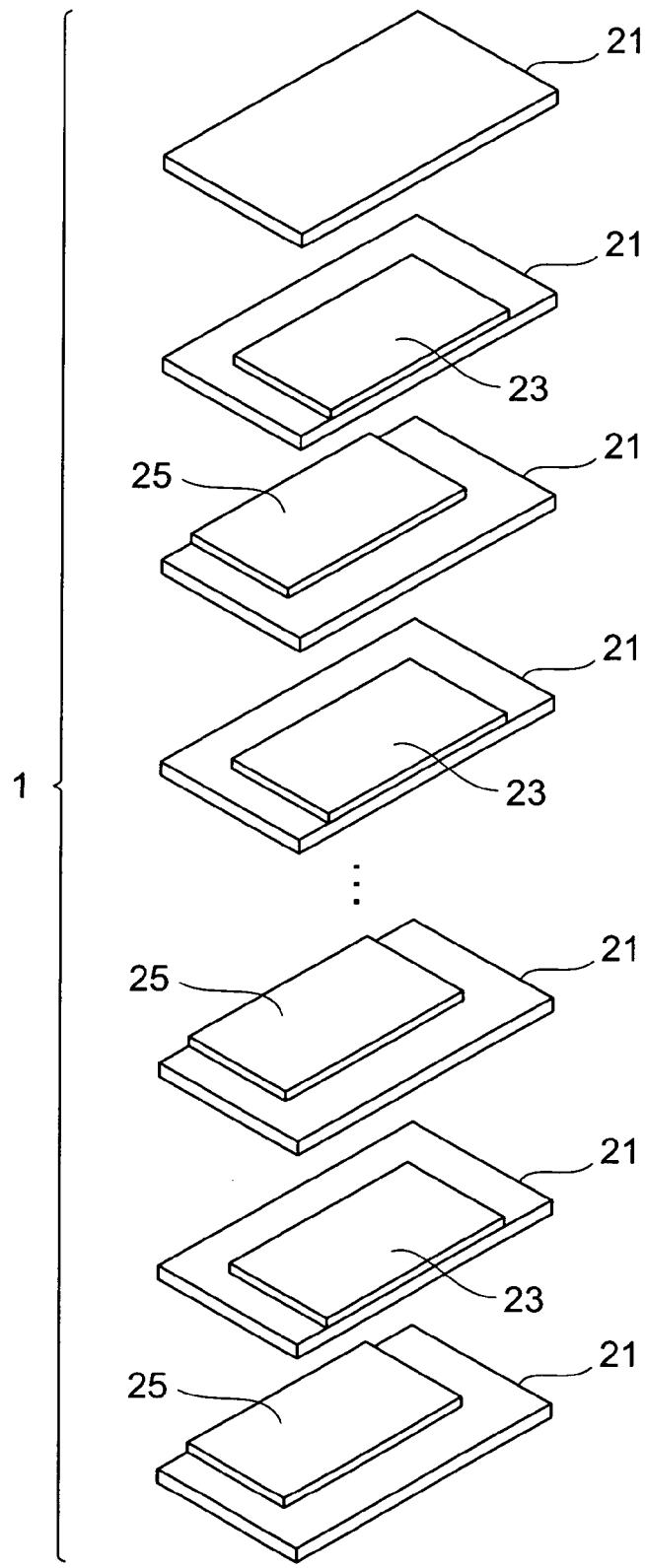
FIG. 3 is an exploded perspective view of a chip element body included in the multilayer chip capacitor in accordance with the embodiment.
Figure 4:
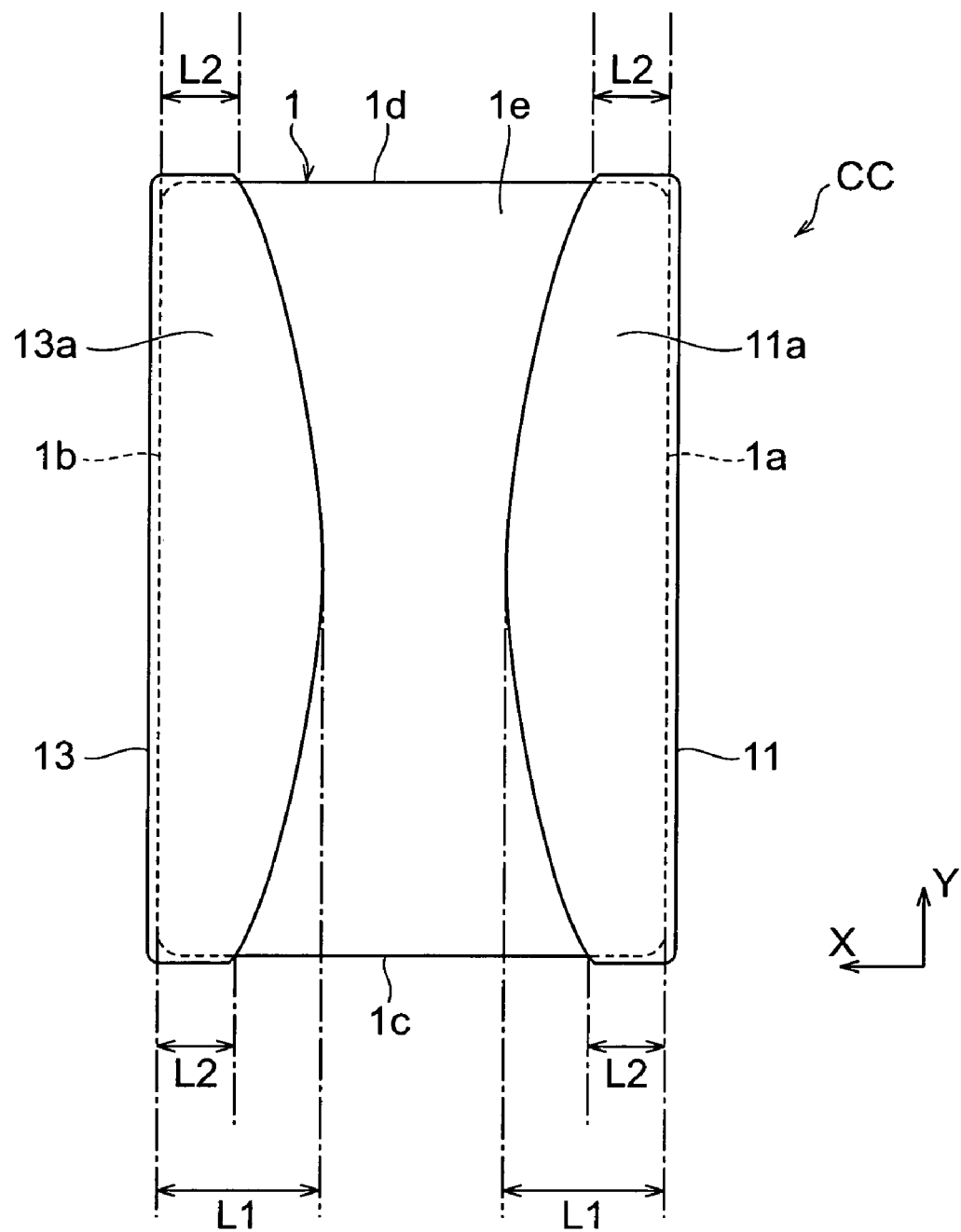
FIG. 4 is a schematic plan view showing the multilayer chip capacitor in accordance with the embodiment.

First, with reference to FIGS. 1 to 4, the configuration of the multilayer chip capacitor in accordance with this embodiment will be explained. FIG. 1 is a perspective view showing the multilayer chip capacitor in accordance with this embodiment. FIG. 2 is a view for explaining a cross-sectional configuration of the multilayer chip capacitor in accordance with this embodiment. FIG. 3 is an exploded perspective view of a chip element body included in the multilayer chip capacitor in accordance with the embodiment. FIG. 4 is a schematic plan view showing the multilayer chip capacitor in accordance with this embodiment.

As shown in FIG. 1, the multilayer chip capacitor CC comprises a rectangular parallelepiped chip element body 1 and a pair of terminal electrodes 11, 13. As shown in FIGS. 2 and 3, the chip element body 1 is constituted by first inner electrodes 23 and second inner electrodes 25 which are alternately laminated with dielectric layers 21 interposed therebetween. The multilayer chip capacitor CC has a mass of about 0.0015 mg. In practice, the multilayer chip capacitor CC is so integrated that boundaries of the dielectric layers 21 are not visually discernible. In this embodiment, a capacitor constructed by the first inner electrodes 23, second inner electrodes 25, and dielectric layers 21 becomes an inner circuit element.

The chip element body 1 has first to sixth side faces 1a to 1f. The first side face 1a and second side face 1b are positioned so as to oppose each other in the X-axis direction. The third side face 1c and fourth side face 1d are positioned so as to oppose each other in the Y-axis direction. The fifth side face 1e and sixth side face 1f are positioned so as to oppose each other in the Z-axis direction. The fifth side face 1e is a surface (mounting surface) opposing a circuit substrate (not depicted) when mounting the multilayer chip capacitor CC to the circuit substrate.

The chip element body 1 has a length of 0.5 mm in the X-axis direction. The chip element body 1 has a length of 1.0 mm in the Y-axis direction. The chip element body 1 has a length of 0.5 mm in the Z-axis direction. The multilayer chip capacitor CC is a multilayer chip capacitor of so-called "0510" type. The Y-axis direction is the longitudinal direction of the chip element body 1 (multilayer chip capacitor CC). The X-axis direction is the width direction of the chip element body 1 (multilayer chip capacitor CC). The Z-axis direction is the height direction of the chip element body 1 (multilayer chip capacitor CC).

Each of the first to fourth side faces 1a to 1d is parallel to the Z-axis direction, i.e., the laminating direction of the first inner electrodes 23 and second inner electrodes 25 (hereinafter simply referred to as "laminating direction"). Each of the fifth and sixth side faces 1e, 1f is perpendicular to the laminating direction.

One terminal electrode 11 is positioned on the first side face 1a side of the chip element body 1. The terminal electrode 11 is formed so as to cover the first side face 1a while partly surrounding the third to sixth side faces 1c to 1f. As a consequence, the terminal electrode 11 includes an electrode portion 11a formed on the fifth side face 1e.

The other terminal electrode 13 is positioned on the second side face 1b side of the chip element body 1. The terminal electrode 13 is formed so as to cover the second side face 1b while partly surrounding the third to sixth side faces. Consequently, the terminal electrode 13 includes an electrode portion 13a formed on the fifth side face 1e as with the terminal electrode 11.

The first inner electrodes 23 have a rectangular form. The first inner electrodes 23 are formed at respective positions separated from the second side face 1b by a predetermined distance, and extend so as to reach the first side face 1a. As a consequence, the first inner electrodes 23 are drawn to the first side face 1a, so as to be electrically connected to one terminal electrode 11.

The second inner electrodes 25 have a rectangular form. The second inner electrodes 25 are formed at respective positions separated from the first side face 1a by a predetermined distance, and extend so as to reach the second side face 1b. As a consequence, the second inner electrodes 25 are drawn to the second side face 1b, so as to be electrically connected to the other terminal electrode 13.

The electrode portion 11a of one terminal electrode 11 and the electrode portion 13a of the other terminal electrode 13 oppose each other in the X-axis direction on the fifth side face 1e as shown in FIG. 4 as well. A first length L1 is the length of the electrode portion 11a, 13a of each terminal electrode 11, 13 along the X-axis direction from an edge portion of the fifth side face 1e at a center region in the Y-axis direction. A second length L2 is the length of the electrode portion 11a, 13a of each terminal electrode 11, 13 along the X-axis direction from the edge portion of the fifth side face 1e at both end regions in the Y-axis direction. The first length L1 is set longer than the second length L2. As with the above-mentioned electrode portions 11a, 13a, the electrode portions of the terminal electrodes 11, 13 formed on the sixth side face 1f are set such that the length along the X-axis direction from an edge portion is longer at the center region in the Y-axis direction than at both end regions in the Y-axis direction.

Since the first length L1 of the electrode portion 11a, 13a of each terminal electrode 11, 13 along the X-axis direction from an edge portion of the fifth side face 1e at the center region in the Y-axis direction is set longer than the second length L2 along the X-axis direction from the edge portion of the fifth side face 1e at both end regions in the Y-axis direction, this embodiment can restrain the multilayer chip capacitor CC from generating the tombstone, and can enhance the resistance to thermal shocks.

By defining shapes of the electrode portions 11a, 13a formed on the fifth side face 1e as mentioned above, this embodiment can suppress the occurrence of tombstone. This makes it unnecessary to provide terminal electrodes with a protrusion as in the chip-type electronic component disclosed in Japanese Patent Application Laid-Open No. HEI 10-22164, and thus does not contradict the demand for making the chip-type electronic component smaller. Also, this embodiment is not required to form electrodeless portions as in the chip-type electronic component disclosed in Japanese Patent Application Laid-Open No. 2002-25850, whereby its manufacture does not become difficult.

While varying the value of first length L1, the effect of suppressing the occurrence of tombstone was determined. FIG. 5 shows results. As can be seen from FIG. 5, the tombstone occurred when the first length L1 was set to 150 µm. No tombstone occurred when the first length L1 was set to 160 µm or greater. These indicate that setting the first length L1 to 160 µm or greater can prevent the multilayer chip capacitor CC from generating the tombstone. Here, the second length L2 was set to a value identical to the first length L1 in each case.

As the first length L1 is made greater, the gap between the electrode portion 11a of one terminal electrode 11 and the electrode portion 13a of the other terminal electrode 13 on the fifth side face 1e becomes narrower. As a result, one terminal electrode 11 and the other terminal electrode 13 may be short-circuited. Therefore, while varying the value of first length L1, whether one terminal electrode 11 and the other terminal electrode 13 were short-circuited or not was determined. FIG. 5 also shows these results. As can be seen from FIG. 5, one terminal electrode 11 and the other terminal electrode 13 were short-circuited when the first length L1 was set to 210 µm. When the first length L1 was set to 200 µm or less, one terminal electrode 11 and the other terminal electrode 13 were not short-circuited. These indicate that setting the first length L1 to 200 µm or less can prevent one terminal electrode 11 and the other terminal electrode 13 from being short-circuited. Here, the second length L2 was set to a value identical to the first length L1 in each case.

Subsequently, while varying the value of difference between the first length L1 and second length L2, the capability of enhancing the resistance to thermal shocks was determined. FIG. 6 shows results. As can be seen from FIG. 6, cracks occurred in the chip element body 1 when the difference between the first length L1 and second length L2 was set to 5 µm. When the difference between the first length L1 and second length L2 was set to 10 µm or greater, no cracks occurred in the chip element body 1 even after a thermal shock test. These indicate that setting the difference between the first length L1 and second length L2 to 10 µm or greater can enhance the resistance of the multilayer chip capacitor CC to thermal shocks. Here, while setting the first length L1 to 180 µm, the second length L2 was varied, so as to change the value of difference between the first length L1 and second length L2.

As the difference between the first length L1 and second length L2 was made greater, the contact area between the electrode portions 11a, 13a and circuit substrate becomes smaller. As a result, the multilayer chip capacitor CC may rotate in a direction horizontal to the circuit substrate when being mounted to the latter. Therefore, while varying the value of difference between the first length L1 and second length L2, whether the multilayer chip capacitor CC rotated to generate mounting failures or not was determined. FIG. 6 also shows these results. When the difference between the first length L1 and second length L2 was set to 55 µm, as can be seen from FIG. 6, the multilayer chip capacitor CC rotated in a horizontal direction, thereby generating mounting failures. No mounting failures occurred when the difference between the first length L1 and second length L2 was set to 50 µm or less.

In the above-mentioned thermal shock test, a heat treatment cycle constituted by the following steps (i) to (iv) was repeated 1,000 times for the multilayer chip capacitor CC mounted on the circuit substrate. Namely, one heat treatment cycle comprises the steps of (i) holding the circuit substrate and multilayer chip capacitor CC for 30 minutes under such a temperature condition that the chip element body attains a temperature of −55° C.; (ii) raising the temperature of the chip element body to 125° C. within 10% (3 minutes) of the holding time mentioned above; (iii) holding the chip element body under such a condition that the chip element body keeps the temperature of 125° C.; and (iv) lowering the temperature of the chip element body to −55° C. within 10% (3 minutes) of the holding time mentioned above. Here, the circuit substrate was a substrate made of glass epoxy (epoxy resin including a glass fiber sheet as a core material).

In general, boundary portions of the side faces $1a$ to $1f$ have been formed into curved surfaces in order to prevent the chip element body from breaking and chipping. When boundary portions between the mounting surface (the fifth side face $1e$ in this embodiment) and side faces where the terminal electrodes are positioned (the first and second side faces $1a$, $1b$ in this embodiment) are formed into curved surfaces, the tombstone is likely to occur. However, it has been verified that this embodiment can suppress the occurrence of tombstone even when the radius of curvature of boundary portions between the fifth side face $1e$ and the first and second side faces $1a$, $1b$ is set to about 20 μm.

While a preferred embodiment of the present invention is explained in detail in the foregoing, the present invention is not limited to the above-mentioned embodiment. For example, the numbers of dielectric layers 21, first inner electrodes 23, and second inner electrodes 25 are not limited to those depicted.

Though one terminal electrode 11 and the other terminal electrode 13 are positioned on the first side face $1a$ side and second side face $1b$ side of the chip element body 1, respectively, in the above-mentioned embodiment, this is not restrictive. For example, one terminal electrode 11 and the other terminal electrode 13 may be positioned on the third side face $1c$ side and fourth side face $1d$ side of the chip element body 1, respectively.

In each of the electrode portions of terminal electrodes 11, 13 formed on the fifth and sixth side faces $1e$, $1f$ in this embodiment, the length along the X-axis direction from the edge portion of each side face $1e$, $1f$ is longer at the center region in the Y-axis direction than at both end regions in the Y-axis direction. However, it will be sufficient if at least the electrode portion formed on a side face to become a mounting surface (the electrode portion $11a$, $13a$ formed on the fifth side face $1e$ in this embodiment) has the relationship of lengths mentioned above.

The chip element body 1 is not limited to that of "0510" type mentioned above. For example, the chip element body 1 may be of "1005" type or a element body greater or smaller than the "0510" type or "1005" type. When the chip element body 1 is greater than the "0510" type or "1005" type, however, mounting failures due to the tombstone or the like are inherently less likely to occur. Therefore, the operations and effects of the present invention can be enjoyed more when the chip element body 1 is a element body not greater than the "0510" type or "1005" type.

Without being restricted to the multilayer chip capacitor, the present invention may also be employed in inductors, thermistors, varistors, and filters (composite components) as long as they are chip-type electronic components comprising a chip element body including an inner circuit element, and a pair of terminal electrodes positioned at respective end portions of the chip element body and electrically connected to the inner circuit element.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A chip-type electronic component comprising:
a chip element body including an inner circuit element, and a pair of terminal electrodes positioned at respective end portions of the chip element body and electrically connected to the inner circuit element;
wherein the chip element body has one side face acting as a mounting surface opposing a circuit substrate;
wherein the pair of terminal electrodes include an electrode portion formed on the mounting surface; and
wherein, assuming that a first direction is a direction orthogonal to the mounting surface, a second direction is a direction along which the pair of terminal electrodes oppose each other on the mounting surface, and a third direction is a direction orthogonal to the first and second directions, a first length of the electrode portion along the second direction from an edge portion of the mounting surface at a center region in the third direction is set longer than a second length of the electrode portion along the second direction from the edge portion of the mounting surface at both end regions in the third direction.

2. A chip-type electronic component according to claim 1, wherein the first length is set to 160 μm or longer; and
wherein the difference between the first and second lengths is set to 10 μm or longer.

3. A chip-type electronic component according to claim 2, wherein the first length is set to 200 μm or less.

4. A chip-type electronic component according to claim 2, wherein the difference between the first and second lengths is set to 50 μm or less.

5. A chip-type electronic component according to claim 1, wherein the chip element body has a rectangular parallelepiped form; and
wherein the third direction is a longitudinal direction of the chip element body.

6. A chip-type electronic component according to claim 2, wherein the chip element body has a rectangular parallelepiped form whose lengths in the longitudinal direction (L), height direction (H), and width direction (W) are $L \leq 1.0$ mm, $H \leq 0.5$ mm, and $W \leq 0.5$ mm.

\* \* \* \* \*